(12) United States Patent
Wesneski et al.

(10) Patent No.: US 11,551,635 B2
(45) Date of Patent: Jan. 10, 2023

(54) DETERMINING WHETHER VIDEO DISPLAY INTERFACES ARE COUPLED TO TERMINATIONS

(71) Applicant: HEWLETT PACKARD ENTERPRISE DEVELOPMENT LP, Houston, TX (US)

(72) Inventors: Christopher M. Wesneski, Plano, TX (US); Sze Hau Loh, Houston, TX (US); Theodore F. Emerson, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 44 days.

(21) Appl. No.: 16/943,472

(22) Filed: Jul. 30, 2020

(65) Prior Publication Data

US 2022/0036852 A1 Feb. 3, 2022

(51) Int. Cl.
*G09G 5/00* (2006.01)
*G06F 3/14* (2006.01)

(52) U.S. Cl.
CPC ........... *G09G 5/006* (2013.01); *G06F 3/1407* (2013.01); *G09G 2370/08* (2013.01); *G09G 2370/22* (2013.01)

(58) Field of Classification Search
CPC .. G06F 3/1407; G09G 5/006; G09G 2370/08; G09G 2370/22
See application file for complete search history.

(56) References Cited

U.S. PATENT DOCUMENTS

| | | | |
|---|---|---|---|
| 5,559,427 A | 9/1996 | Hinds et al. | |
| 6,819,305 B2 | 11/2004 | Wicker | |
| 7,477,247 B2 | 1/2009 | Yee et al. | |
| 8,411,073 B2 | 4/2013 | Glen et al. | |
| 8,878,859 B1 | 11/2014 | Van Scherrenburg et al. | |
| 8,966,128 B1 | 2/2015 | Li et al. | |
| 9,366,712 B2 * | 6/2016 | Wong | G06F 11/349 |
| 10,083,143 B2 * | 9/2018 | Tanimura | G05B 19/054 |

FOREIGN PATENT DOCUMENTS

DE 69432173 T2 11/2003

OTHER PUBLICATIONS

PERICOM, "HPD signal Generator for VGA," Aug. 7, 2015, pp. 1-7, PI3VST01.

* cited by examiner

*Primary Examiner* — Henry Tsai
*Assistant Examiner* — John B Roche
(74) *Attorney, Agent, or Firm* — Trop, Pruner & Hu, P.C.

(57) ABSTRACT

A process includes controlling a current source to cause the current source to provide a plurality of different currents at different times to an output communication line of a video display interface; and acquiring a plurality of voltages corresponding to the plurality of different currents. Acquiring the plurality of voltages includes sampling a voltage of the output communication line. The process includes comparing the plurality of voltages to a plurality of voltage thresholds; and based on a result of the comparison, determining whether the video display interface is coupled to a cable-based far end termination.

20 Claims, 8 Drawing Sheets

DETERMINING WHETHER VIDEO DISPLAY INTERFACES ARE COUPLED TO TERMINATIONS

BACKGROUND

A computer system may contain a video display interface, such as a Video Graphics Array (VGA) interface, for purposes of converting digital video data, which represents video, into analog signals that may be used to drive a display device, such as a television or a monitor. In general, the video may be a stream of time successive images, or frames, with each frame corresponding to a full screen on the display device. A frame includes a set of horizontal lines of pixels. The analog signals that are provided by the video display interface may include three color signals that represent respective primary pixel color components, such as red, green and blue; and the analog signals may embed a pixel clock signal that has timing edges to indicate when the color signals coincide with different pixels. The analog signals may also include a horizontal synchronization signal that has synchronization pulses to demarcate the horizontal lines of pixels and a vertical synchronization signal that has synchronization pulses to demarcate the frames.

DETAILED DESCRIPTION

Figure 1:
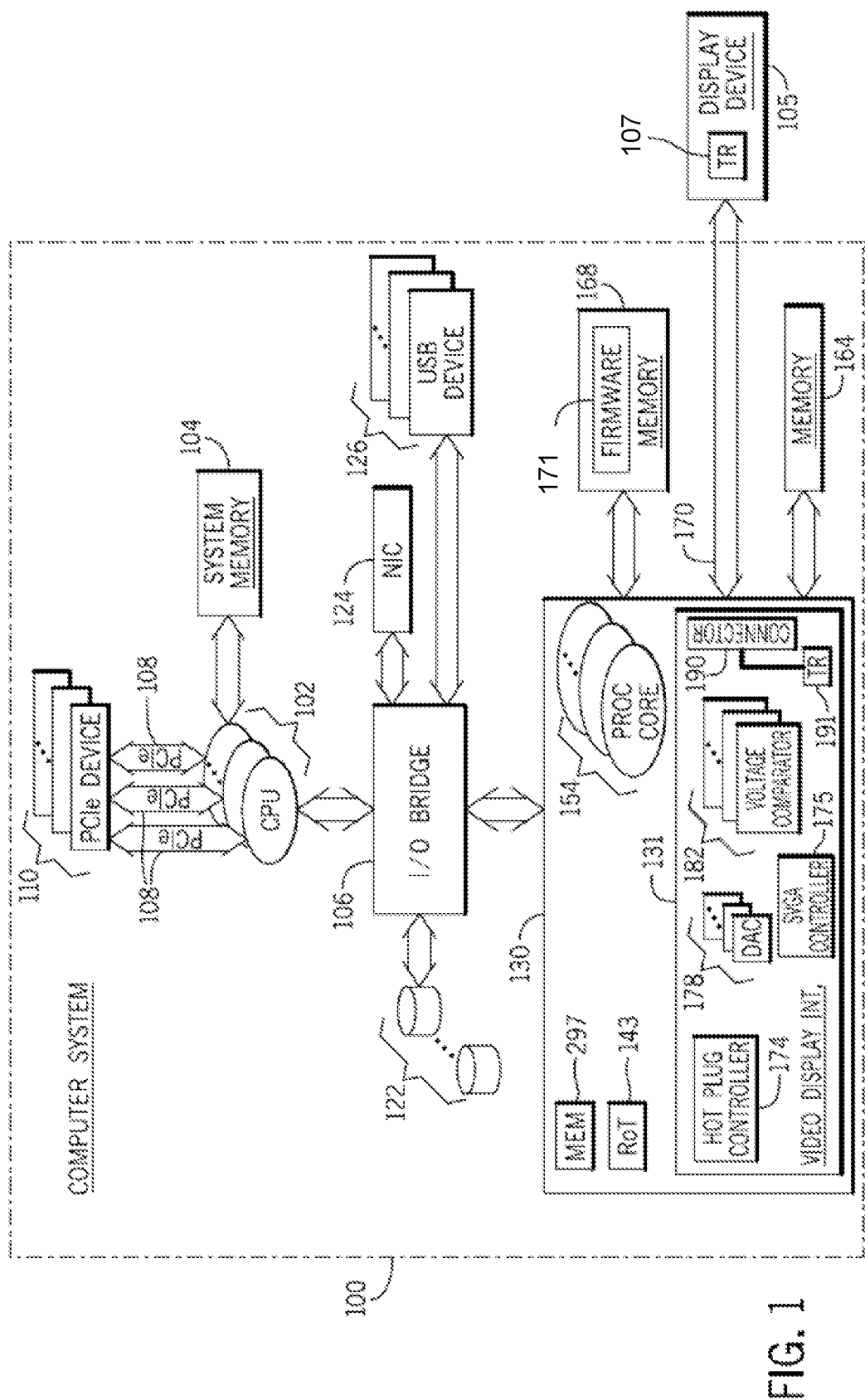
FIG. 1 is a schematic diagram of a computer system having a video display interface that is constructed to detect far end and near end video cable terminations according to an example implementation.

An electronic system, such as a computer system, may contain a video display interface for purposes of providing a set of output signals to cause a display device, such as a television or monitor, to display video. In this context, a "video" refers to a stream or series of visual images; and the "video display interface" generally refers to a subsystem of the electronic system, which electrically and mechanically connects to a video cable and provides the video content communicating output signals to the communication lines of the video cable. As an example, the video display interface may include such components as a frame buffer, a video controller and a cable connector. Moreover, the video display interface may include a hot plug controller to manage the connection and disconnection of the cable to/from the cable connector while the electronic system (and connector) remains powered on. As a specific example, the video display interface may be a Video Graphics Array (VGA)-compliant interface, which is constructed to convert digital video data into analog video signals that correspond to the VGA standard. The VGA interface may provide analog video signals to the terminals or pins of a VGA connector (e.g., a female DE-15 connector, for example), which is constructed to mate with a connector of a VGA video cable. In this context, the "VGA standard" refers to the original VGA standard that was introduced in 1987, as well as variants from the original VGA standard, such as, Super VGA (SVGA), XGA and so forth.

A video cable connector, such as a VGA cable connector, may not provide a presence indication to inform the electronic system whether or not a display device is connected to the video display interface. However, it may be beneficial for the electronic system to know whether or not a display device is connected. For example, if a display device is not connected, the electronic system may power down components that produce and/or process video content for such purposes as reducing power consumption and reducing electromagnetic interference (EMI) emissions. Therefore, the electronic system may undertake measures to investigate whether or not a display device is connected.

One way in which the electronic system may detect whether a display device is connected to the video display interface is to inject a current into a pin of the video cable connector and then observe a resulting voltage of the pin. The voltage of the pin is a function of the injected current and the resistance that is connected to the pin; and accordingly, the voltage may be used as an indication of the connection status.

For example, the video cable connector may be expected to be connected to a 75 ohm video cable, and as such, the electronic system may provide a near end termination of 75 ohms. In this context, the "near end termination" refers to the termination that is provided by the electronic system at the "near end" of the video, which is the end of the cable that is the nearest, or closest, to the video display interface. When connected, the display device provides a "far end termination," at the end of the video cable, which is farthest away from the video display interface. In this context, the "termination" refers to a connection of a set of one or multiple impedance devices, such as resistors, to the communication line(s) of the video display cable to achieve the desired characteristic impedance for signal transmission. In accordance with example implementations, the near end termination includes a set of resistors, where each resistor is connected between a pin of the video display interface connector and ground; and the far end termination includes a set of resistors, where each resistor is connected between a pin of the video cable connector of the display device and ground. Accordingly, for the 75 ohm characteristic impedance example for the video display cable, the near end termination may include 75 ohm resistors coupled between the pins of the video cable connector and ground, and the far end termination may include 75 ohm resistors coupled between the pins of the video cable connector of the display device.

Continuing this example, when a video cable is connected, the electronic system expects to observe, at a given pin of the video cable connector, a near end resistance of 75 ohms in parallel with a far end resistance of 75 ohms, or 37.5 ohms. As such, when the electronic system injects a current having a predetermined magnitude into the given pin, the injected current should produce (after stabilization) an observed pin voltage equal to or near the product of the current magnitude and the 37.5 ohms resistance, if a video cable is connected. Otherwise, if a video cable is not connected, the effective resistance is 75 ohms (due to the near end termination), and the observed pin voltage is larger for a given injected current. Therefore, by comparing the observed pin voltage to an expected threshold, the electronic system may determine whether or not a video cable is connected.

There may be certain challenges in using with the above-described approach to detect whether or not a video cable is connected. For example, the pin voltage may undergo a transient response (e.g., exhibit an overshoot, ringing and so forth) to the current injection. Moreover, the video cable may be degraded, thereby causing the pin voltage to significantly differ from the expected voltage. As another example, the display device may not connect the far end termination until the display device detects a certain magnitude of current being provided to the video cable. For any of these scenarios, the observed pin voltage that is produced by the injection of current may not accurately indicate whether or not a video cable is connected.

In accordance with example implementations that are described herein, an electronic system detects whether a video cable is connected to the electronic system's video cable connector by injecting a plurality of different currents to a given pin of the connector and performing a corresponding plurality of voltage comparisons of the resulting voltages that appear on the pin in response to these currents. As described herein, the plurality of voltage comparisons are made with respect to corresponding voltage thresholds that are selected based on the current termination state. Based on these plurality of voltage comparisons, the electronic system may determine whether a video cable has been connected. The multiple injected currents and multiple voltage comparisons provide a robust termination detection, which accommodates cable degradation and accommodates a display device that may not turn on, or connect, its far end termination for a current below a certain threshold. Moreover, in accordance with example implementations, the electronic system injects the plurality of currents to the pin according to a controlled current magnitude-time profile in which the current magnitude gradually increases, or ramps up, for purposes of inhibiting or suppressing transient effects in the observed pin voltage.

Moreover, in accordance with example implementations, the electronic system may use a similar technique to detect a near end termination, which may be advantageous to determine whether or not the electronic system is using its video display interface. In this manner, the video display interface may be part of a multifunction component that may be used in several models, or versions, of the electronic system; and in one or multiple versions, the electronic system may not use a video output of the multifunction component, and as such, the electronic system may not have a video display interface connector and a near end termination. By detecting that the near end termination is not present, the electronic system may then power off components that are dedicated to providing and/or processing video content, thereby reducing power and EMI emissions.

Referring to FIG. 1, as a more specific example, in accordance with some implementations, an electronic system may include a video display interface 131 for purposes of converting digital data representing video into analog signals that may be used as input for a display device 105 (e.g., a monitor or a television). For this purpose, the video display interface 131 may include a video display controller, such as an SVGA controller 175. To connect the video display interface 131 to the display device 105, a cable containing analog, video signal communication lines 170 (e.g., a cable having wires to communicate VGA standard signals) may have a "near end" connector (e.g., a DE-15 male connector) that is constructed to mechanically mate with and form electrical connections with a cable connector 190 (also called a "connector 190" herein and which may be, for example, a DE-15 female connector) of the video display interface 131 and a "far end" connector (not shown in FIG. 1, which may be, for example, a DE-15 male connector) that is constructed to mechanically mate with and form electrical connections with a cable connector (e.g., a DE-15 female connector) of the display device 105.

In accordance with example implementations, the electronic system may be a computer system 100, such as a server, a client, a desktop computer, a laptop computer, a tablet computer, a smartphone, a wearable computer, a rack mounted module, and so forth.

In accordance with example implementations, the video display interface 131 determines, or detects, the presence or lack thereof of near end and far end video cable terminations. As described herein, the corresponding determination detection processes may be used for a number of purposes, such as detecting a far end termination (i.e., determining whether a cable connects the video display connector 190 to the display device 105), detecting cable disconnection (i.e., detecting removal of a previously detected far end termination), and detecting a near end termination (i.e., detecting whether the video display interface 131 is being used by the computer system 100). FIG. 1 depicts an example implementation that includes a near end termination 191 and a far end termination 107. Although FIG. 1 depicts a near end termination 191, in accordance with further example implementations, the computer system 100 may not include a near end termination. The lack of a near end termination may be due to, for example, the video display interface 131 being part of a multiple function computer system component (i.e., a component that provides a video output as well as performs one or multiple functions other than providing a video output), and the video output of the component may not be used for the particular model of the computer system 100. In this manner, for a computer system in which the video display interface 131 is not being used to supply a video output, the computer system may not include the cable connector 190 (as depicted in the example implementation of FIG. 1), and the computer system may not include the corresponding near end 75 ohm termination resistors. Therefore, the video display interface 131, in accordance with example implementations, in response to determining that near end termination 191 is not present, shuts down power consuming components of the video display interface 131, such as the interface's current output DACs 178. Shutting down the current output DACs 178 when unused, in turn, may have certain benefits, such as reducing power consumption and reducing the computer system's EMI emissions.

In a similar manner, if the video display interface 131 fails to detect a far end termination 107, then, in accordance with example implementations, the video display interface 131 shuts down, or powers off, the current output DACs 178, for purposes of reducing power consumption and EMI emissions.

For the specific example implementation that is depicted in FIG. 1, the video display interface 131 is part of a baseboard management controller (BMC) 130. As described further herein, the BMC 130 performs a number of functions other than providing a video output. The BMC 130 may be used in a number of different models, or versions, of the computer system, and as such, the BMC 130 may be used in a computer system (other than the depicted computer system 100) that does not use the video display interface 131. In accordance with further implementations, the video display interface 131 may be part of a multiple function component other than a BMC or may be a standalone component (e.g., a graphics display card, an embedded graphics display system, a system on a chip (SoC), and so forth) dedicating solely to the purpose of providing a video output.

As used herein, a "baseboard management controller" is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) application program interface (API), or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for subsystems of a computing device, and is separate from a processing resource that executes an operating system of a computing device. The baseboard management controller is separate from a processor, such as a central processing unit (CPU) (e.g., a CPU 102), which executes a high-level operating system or hypervisor on a system.

In accordance with example implementations, in addition to the video display interface 131, the computer system 100 includes one or multiple CPUs 102 (e.g., CPU processing cores, semiconductor containing CPU processor cores), and memory devices that connected to the CPU(s) to form a system memory 104 The CPU(s) 102 may be coupled to an input/output (I/O) bridge 106. Moreover, as also depicted in FIG. 1, the computer system 100 may include one or multiple Peripheral Component Interconnect Express (PCIe) devices 110 (e.g., PCIe expansion cards) that may be coupled to the CPU(s) 102 through corresponding individual PCIe bus(es) 108. In accordance with a further example implementation, the PCIe device(s) 110 may be coupled to the I/O bridge 106, instead of being coupled to the CPU(s) 102. In general, the I/O bridge 106 may connect the CPU(s) 102 to the BMC 130, one or multiple storage devices 122, one or multiple network interface controllers (NICs) 124 one or multiple universal serial bus (USB) devices 126, and so forth.

In general, the memory devices that form the system memory 104, as well as other memory devices that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In accordance with example implementations, the BMC 130 contains general purpose processing core(s) 154 (e.g., Advanced Risc Machine (ARM) processing cores), which the baseboard management controller 130 holds in reset upon power on reset. After performing initial root of trust security checks as well as other checks (e.g., hardware fault checks), the BMC 130 releases the general purpose processing core(s) 154 from reset. More specifically, in accordance with example implementations, the baseboard management controller 130 is coupled to an external non-volatile memory 168 that stores firmware 171 that is validated by the BMC 130 and executed by a CPU 102 to boot the computer system 100. In accordance with example implementations, the BMC 130 contains a hardware root of trust (RoT) engine 143. In accordance with example implementations, the RoT engine 143 stores an immutable fingerprint, which is used to validate machine executable instructions. More specifically, in response to the BMC 130 being booted (e.g., the BMC 130 being booted at initial powerup of the computer system 100 such as when AC power is applied to the computer system 100), the RoT engine 143 loads a portion of the firmware 171 and places the portion of the firmware into a memory 297 of the BMC 130, secures the memory 297, validates the portion of the firmware 171 (using the immutable fingerprint), and locks the contents of the memory 297 so the contents cannot be altered. When the general purpose processing core(s) 154 are taken out of reset, the core(s) 154 fetch the instructions in the secure memory 297 (which has been validated and locked from future modifications). The firmware instructions in the memory 297 are executed by the general purpose processing core(s) to validate the next portion of the firmware 171 which may be executed from memory 168 or, upon finishing the execution of patch instructions, may be copied and executed from a volatile memory 164 (e.g., a memory formed from Double Data Rate (DDR) 4 DRAM devices) that is external to the BMC 130. In accordance with example implementations, the validation of components of the computer system 100 may be performed in a staged fashion (portion 1 validates portion 2 before its allowed to execute and so on), and the "root" of the process is performed in hardware by the RoT engine 143.

In accordance with example implementations, the video display interface 131 may be configured by the CPU(s) 102 of the computer system 100. The memory 164 may be shared by the video display interface 131 and the general purpose processing core(s) 154, so that, in accordance with example implementations, a video controller frame buffer may be stored in the memory 164. In accordance with example implementations, the video display interface 131 may be used for purposes of displaying messages pertaining to the BMC 130 and/or computer system 100. For example, in accordance with some implementations, if a malfunction occurs in the computer system 100 (e.g., a malfunction due to a hardware fault, a cryptographic key check failure, and so forth) then the CPU(s) 102 can detect the malfunction and display error messages on the display device 105 using the video display interface 131. In accordance with further example implementations, the CPU(s) 102 may use the BMC 130 to display messages other than error messages on the display device 105 using the video display interface 131.

Figure 2:
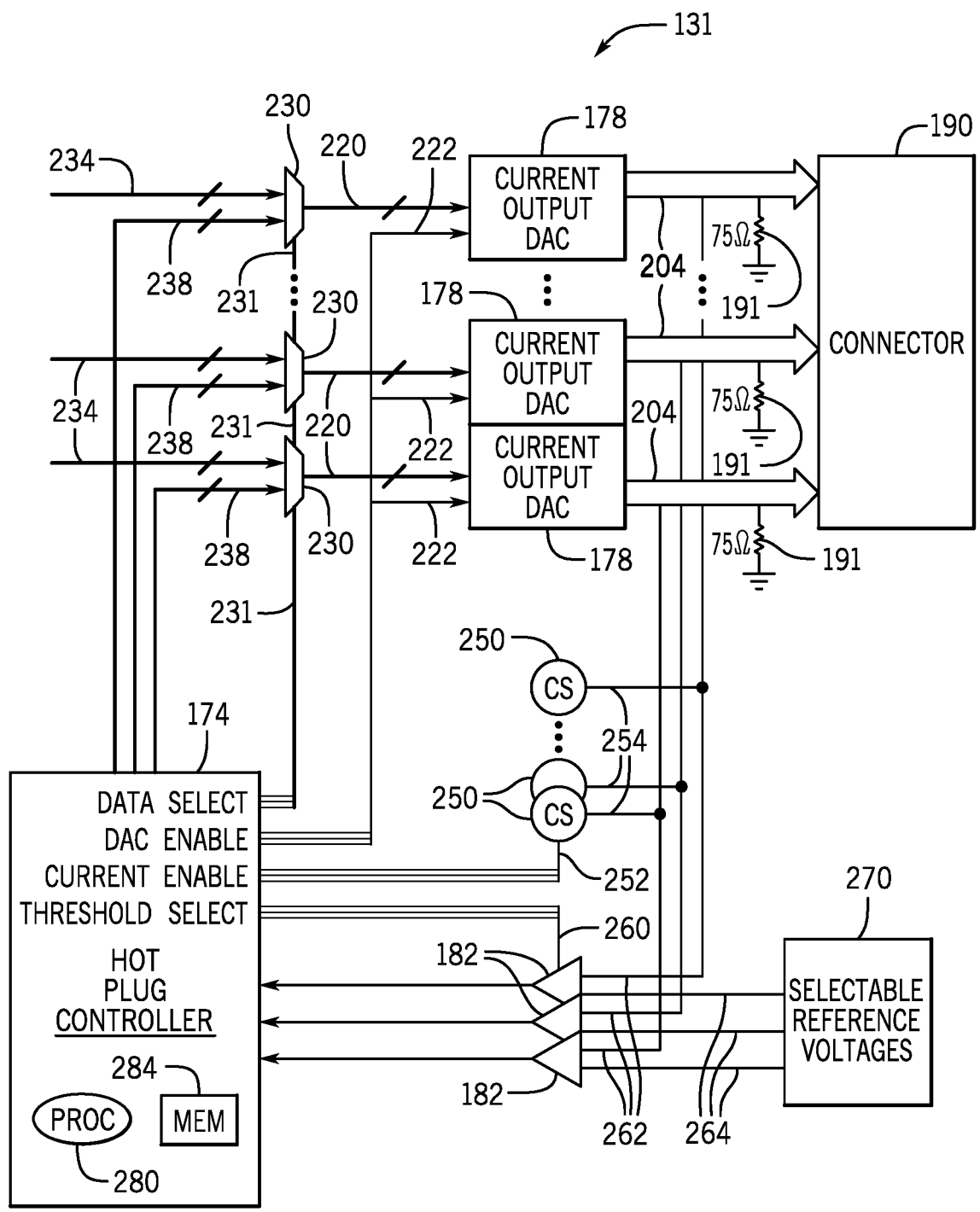
FIG. 2 is a schematic diagram of components of the video display interface of FIG. 1 used to detect far end and near end terminations according to an example implementation.

FIG. 2 depicts components of the video display interface 131 that may be used to detect far end and near end terminations, according to an example implementation. For this implementation, the computer system 100 uses the video output capabilities of the BMC 130, as the pins of the connector 190 (corresponding to video output communication lines 204) are coupled to a near end termination 191 (here, resistors). In the following discussion, the term "pin" is used interchangeably with "video output communication line 204." Referring to FIG. 2 in conjunction with FIG. 1, in accordance with example implementations, the components to detect far end and near end terminations includes a hot plug controller 174; one or multiple voltage comparators 182 that have corresponding selectable thresholds; one or multiple output current DACs 178; and zero, one or multiple fixed current sources 250.

Some of the components that are depicted in FIG. 2, such as the current output DACs 178, may be used by the video display interface 131 to process video content and provide analog signals (e.g., VGA signals) to the pins of the connector 190 according to a particular standard (e.g., a VGA standard). Moreover, in addition to being used to control the far end and near end termination detection (as further described herein), the hot plug controller 174 manages the hot plugging, or hot swapping, of connections to and from the connector 190.

As depicted in FIG. 2, in accordance with example implementations, each voltage comparator 182 has a first input 262 that is the voltage of a particular video output communication line 204 and a second input 264 that receives a selectable reference voltage from a set 270 of selectable reference voltages. As configured by its selectable threshold 260, the comparator 182 compares the voltage of the video output communication line 204 to a voltage threshold, and the comparator 182 provides an output voltage (provided to the hot plug controller 174) that represents a result of this comparison. As depicted in FIG. 2, the hot plug controller 174 is coupled to the output terminals of the comparators 182 to receive signals representing the comparison results.

The number of voltage comparators 182, in accordance with example implementations, depends on the number of pins of the video display interface connector 190 that are used to test for far end and near end terminations. Although FIG. 2 depicts three voltage comparators 182, in accordance with example implementations, the number of voltage comparators 182 of the video display interface 131 may be one, two or three. As such, the video display interface 131 may apply the near end and far end termination detection techniques that are described herein by injecting currents into one or multiple video output communication lines 204 and observing the corresponding voltages on these video output communication lines 204 in response thereto.

As also depicted in FIG. 2, in accordance with example implementations, the video display interface 131 may include one or multiple constant, or fixed, current sources 250. Although FIG. 2 depicts three fixed current sources 250 (corresponding to the far end and near end termination being detected using three pins of the connector 190), in accordance with example implementations, the number of fixed current sources 250 may be one, two or three. As depicted in FIG. 2, in accordance with example implementations, each fixed current source 250 has an output terminal 254 that is coupled to an associated video output communication line 204. Each fixed current source 250 is enabled (via a current enable input 252) by the hot plug controller 174 to provide, during the termination detection, a supplemental direct current (DC) current to its associated video output communication line 204. The supplemental DC current is in addition to the current that is injected by the current output DAC 178 to the video output communication line 204. It is noted that when the termination detection current is applied by the hot plug controller 174 or the fixed current source 250, the video inputs 234 are all zeros so that there is no additional current generated beyond what the controller 174 is enabling. In accordance with further example implementations, the video display interface 131 may not have any fixed current sources 250 that are used for purposes of termination detection.

The video display interface 131 contains multiple current output DACs 178, which are coupled to respective video output communication lines 204 and during the interface's mode of operation, provide analog currents that represent various video output display signals. For example, for VGA, the current output DACs 178 may provide currents that respectively represent a red color component, a green color component, a blue color component, and so forth. In accordance with example implementations, one or multiple of the current output DACs 178 serve the dual purpose of, during the interface's termination detection mode of operation, injecting currents into the video output communication lines 204 for purposes of detecting near end and far end terminations. Although FIG. 2 depicts three video output communication lines 204 and the corresponding current output DACs 178 (corresponding to three pins of the connector 190 being used for termination detection), in accordance with example implementations, one, two or three current output DACs 178 may be used for the termination detection.

In accordance with example implementations, for each current output DAC 178 that is used in termination detection, the video display interface 131 includes an associated multiplexer 230. The multiple bit output 220 of the multiplexer 230 provides a multiple bit, digital data input to the associated current output DAC 178, which represents a current for the current output DAC 178 to inject to the video output communication line 204; and the multiplexer 230 routes one of two multiple bit inputs to the output 220, depending on the mode of operation of the video display interface 131. The connections made by the multiplexers 230 are controlled by the hot plug controller 174, which provides select signals 231 to the multiplexers 230. During the normal mode of operation of the video display interface 131 in which the interface 131 is set up to provide a video output, the hot plug controller 174 controls each multiplexer 230 (via the corresponding select signal 231) so that the multiplexer 230 couples a multiple bit video input 234 to the corresponding current output DAC 178; and during a termination detection mode of operation, the hot plug controller 174 controls each multiplexer 230 (via the corresponding select signal 231) so that the multiplexer 230 couples a second multiple bit input 238 to the corresponding current output DAC 178. The input 238 represents the magnitude of a DC injection current to be provided by the current output DAC 178 to the video output communication line 204. In accordance with some implementations, the current output DACs 178 each have an associated high output impedance so that if a video cable is not connected to the connector 190, the corresponding pin voltages are driven to relatively high voltages that exceed any of the voltage comparison thresholds that are discussed herein.

In accordance with example implementations, the hot plug controller 174 may include one or multiple processors 280 (e.g., one or multiple CPUs, one or multiple CPU processing cores, and so forth) and a memory 284. As an example, the memory 284 may store machine executable instructions (or "software"), which the processor(s) 280 execute for purposes of performing one or more functions of the hot plug controller 174, such as functions relating to managing hot plugging and the functions described herein for purposes of performing the near end and far end termination detection. In accordance with further example implementations, the far end and near end termination detection may be performed by a controller (e.g., the SVGA controller 175 of FIG. 1 or a dedicated controller) other than the hot plug controller 174. In accordance with further example implementations, hardwired circuitry (i.e., circuitry that does not execute machine executable instructions) of the hot plug controller 174, such as logic, a programmable logic device, and so forth, may perform part of or all of the termination detection. Therefore, many implementations are contemplated, which are within the scope of the appended claims.

It is noted that the video display interface 131 may have other components that are not depicted in FIGS. 1 and 2, such as, for example, sample and hold circuits coupled to the video output communication lines 204 to provide voltages to the inputs 262 of the comparators 182; components to retrieve digital video data from the memory 164 (FIG. 1); a local memory used to store the retrieved digital video data and/or convert the data into the appropriate format for conversion by the current output DACs 178; and so forth.

Figure 3A:
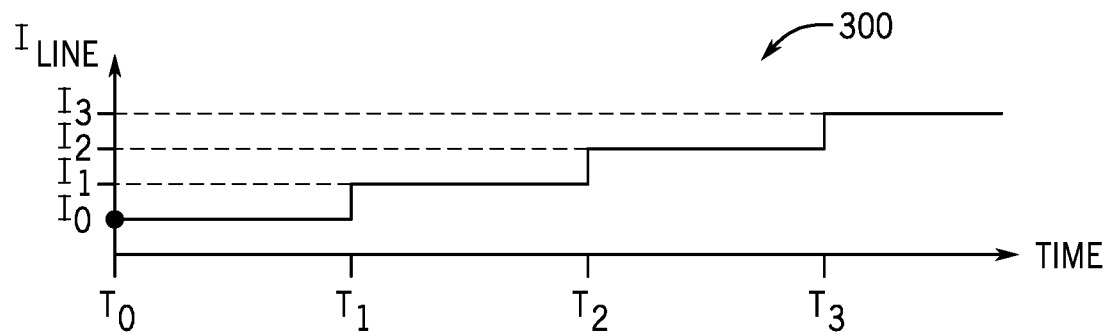
FIG. 3A is a waveform illustrating currents that are injected into a video output communication line for purposes of detecting a far end termination according to an example implementation.

FIG. 3A is an illustration 300 of a current waveform (called "$I_{LINE}$" in FIG. 3A) of the video output communication line 204 illustrating different currents $I_0$, $I_1$ $I_2$ and $I_3$ that may be injected into the line 204 by the video display interface 131 for purposes of detecting a far end termination. Referring to FIG. 3A in conjunction with FIG. 2, in general, as part of the far end termination detection process, the hot plug controller 174 controls the input 238 to the current output DAC 178 to gradually increase, or ramp up, the magnitude of the $I_{LINE}$ current during the far end termination detection. In this manner, as depicted in FIG. 3A, during a particular time interval from time $T_0$ to time $T_1$, the hot plug controller 174 causes the current output DAC 178 to provide a current such that the $I_0$ current is injected to the video output communication line 204. At or near time $T_1$, the hot plug controller 174 causes the current output DAC 178 to provide a current such that the $I_1$ current is injected into the video output communication line 204.

As depicted in FIG. 3A, the $I_1$ current has a greater magnitude than the $I_0$ current. At or near time $T_2$, the hot plug controller 174 increases the $I_{LINE}$ current by causing the current output DAC 178 to provide a current such that the $I_2$ current (which is greater in magnitude than the $I_1$ current) is injected into the video output communication line 204. At or near time $T_3$, the hot plug controller 174 increases the $I_{LINE}$ current by causing the current output DAC 178 to provide a current such that the $I_3$ current (which is greater in magnitude than the $I_2$ current) is injected into the video output communication line 204. Thus, in accordance with example implementations, the hot plug controller 174 gradually steps up the $I_{LINE}$ current, as depicted in FIG. 3A, during the far end detection process. Moreover, although FIG. 3A depicts the injected currents as being stair step functions, in accordance with further example implementations, the injected currents may mimic a ramp function over an allocated time, as well as have corresponding wave forms other than stair steps or ramp functions.

In accordance with example implementations, the voltage comparator 182 (which corresponds to the video output communication line 204 in which the currents are injected) makes multiple comparisons of the voltage of the video output communication line 204 and provides outputs representing the results of the comparisons. The voltage comparator 182 may make multiple comparisons for a given injected current and may make multiple comparisons corresponding to different injected currents. The hot plug controller 174 determines whether a far end termination is detected based on these voltage comparisons.

Figure 3B:
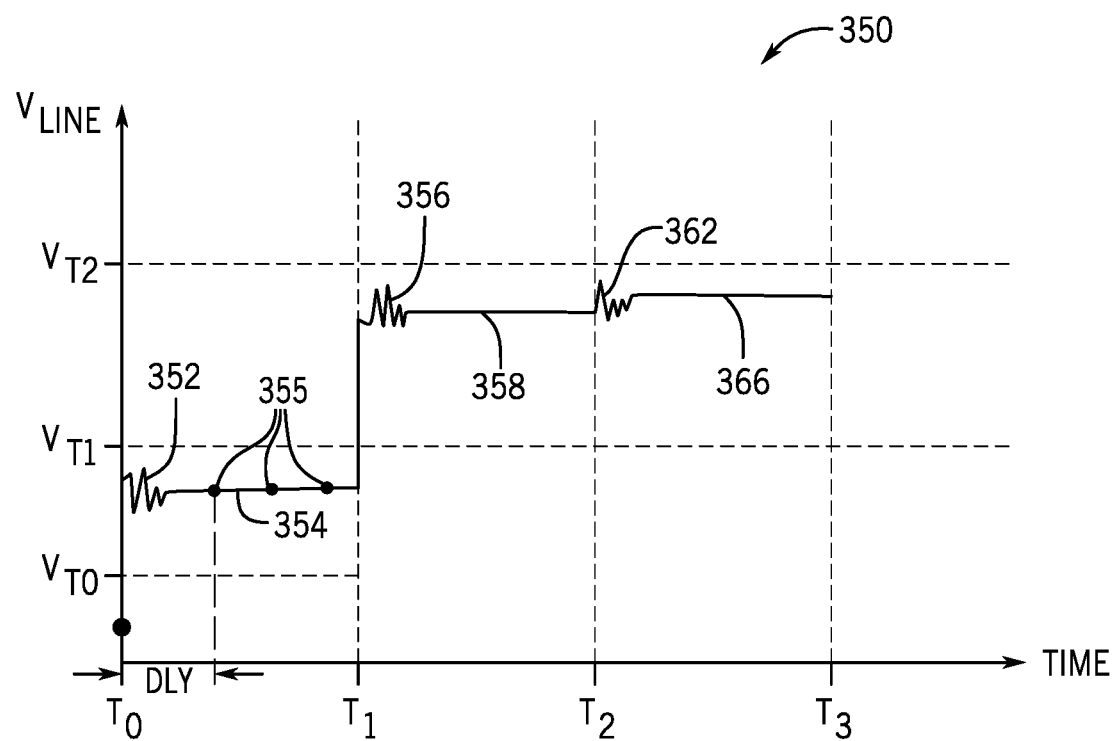
FIG. 3B is a waveform of a voltage of the video output communication line in response to the currents of FIG. 3A according to an example implementation.

FIG. 3B depicts an illustration 350 of a voltage waveform (called "$V_{LINE}$" in FIG. 3B) of the video output communication line 204 in response to the injection of the example $I_0$, $I_1$ and $I_2$ currents of FIG. 3A. Referring to FIG. 3B in conjunction with FIG. 3A and FIG. 2, at or near time $T_0$, in response to the injected $I_0$ current, the $V_{LINE}$ voltage has an initial portion 352 representing a ringing, or overshoot, due the current increase before the $V_{LINE}$ voltage settles to a relatively constant magnitude, as depicted at reference numeral 354. For purposes of detecting the presence of a far end termination based on the $I_0$ current, the hot plug controller 174 sets the voltage threshold of the comparator 182 to a voltage threshold $V_{T0}$, which represents a voltage that corresponds to the product of the $I_0$ current and the resistance (e.g., 37.5 ohms) that is expected on the video output communication line 204 if the far end termination is present. In other words, if the comparison result that is provided by the comparator 182 indicates (e.g., via an assertion) that the $V_{LINE}$ voltage is below the $V_{T0}$ threshold, then this indicates, or represents, detection of the far end termination. For the particular example that is depicted in FIG. 3B, the $V_{LINE}$ voltage is above the $V_{T0}$ voltage threshold, which means that for the time $T_0$ to time $T_1$ interval, the far end termination is not detected. Although a video cable may be connected to the connector 190, the far end termination might not be detected due to the display device 105 (FIG. 1) not sensing sufficient voltage from the cable (i.e., the $I_0$ current is less than a current threshold) to detect the termination 107.

It is noted that in accordance with example implementations, the hot plug controller 174 may use the comparator 182 to perform multiple voltage comparisons corresponding to multiple samples of the $V_{LINE}$ voltage during a particular time interval. These comparisons may be made after a delay is measured from the beginning of the time interval. As an example, for the time interval from time $T_0$ to time $T_1$, after a delay (called "DLY" and in FIG. 3B) from time $T_0$, the hot plug controller 174 uses the comparator 182 to compare multiple samples 355 of the $V_{LINE}$ voltage to the $V_{T0}$ voltage threshold. In accordance with example implementations, if multiple time successive comparisons (e.g., two comparisons) indicate that the $V_{LINE}$ voltage are below the voltage threshold (which is not the case for the time $T_0$ to time $T_1$ interval in FIG. 3B), then the far end termination is deemed to be detected.

The DLY time delay is an example of a particular filter that may be applied by the video display interface 131 to the voltage comparisons to filter out, or remove, transient effects due to the current injection increases. In accordance with further example implementations, the video display interface 131 may perform additional and/or different filtering. For example, in accordance with some implementations, the hot plug controller 174 may apply a digital low pass filter to the voltage comparison results for purposes of filtering out higher frequency transient components. As another example, in accordance with further implementations, the video display interface 131 may include analog low pass filters to filter the outputs of the comparators 182 and/or filter the inputs 262 to the comparators 182. Regardless of the filtering that is used, the filtering, in general, inhibits, or suppresses, the effects of transients in the $V_{LINE}$ voltage due to the current injections, such as a glitch, a back-driven current or a ring-back effect.

Continuing the example that is depicted in FIG. 3B, for the time interval, or period, from time $T_1$ to time $T_2$, the hot plug controller 174 injects the $I_1$ current and correspondingly sets the threshold voltage of the comparator 182 to a higher $V_{T1}$ threshold. For this example, the magnitude of the $I_1$ current is still below the magnitude for the display device 105 to connect the far end termination 107. The $V_{T1}$ threshold voltage is a voltage representing the product of the magnitude of the $I_1$ current and the expected resistance (e.g., 37.5 ohms) if the far end termination is present. Due to the far end termination not being present, the resistance is higher than expected, and as such, as depicted in FIG. 3B, the corresponding $V_{LINE}$ voltage from time $T_1$ to time $T_2$ is above the $V_{T1}$ threshold voltage. Therefore, in the time $T_1$ to time $T_2$ interval the $V_{LINE}$ voltage initially has a ringing portion 356 and a corresponding relatively flat portion 358, which is above the $V_{T1}$ voltage threshold. In the time $T_1$ to time $T_2$ interval, several comparisons of the $V_{LINE}$ voltage may be made and filtering may be employed, similar to that described above for the time $T_0$ to time $T_1$ interval.

At or near time $T_2$, the $I_2$ current is injected, and for this example, the magnitude of the $I_2$ current is sufficient to cause the display device 105 to connect the far end termination 107. As depicted in FIG. 3B, at time $T_2$, the $V_{LINE}$ voltage has an associated ringing portion 362 and a subsequent corresponding relatively flat portion 366, which is below a $V_{T2}$ voltage threshold. The $V_{T2}$ voltage threshold represents the product of the $I_2$ current magnitude and the expected resistance (e.g., 37.5 ohms). In the time $T_2$ to time $T_3$ interval, several comparisons of the $V_{LINE}$ voltage may be made and filtering may be employed, similar to that described above. Because the termination circuit 107 is now connected, the WINE voltage is below the $V_{T2}$ threshold; and as such, multiple voltage comparisons indicate, or represent, detection of the far end termination to the hot plug controller 174. Therefore, in accordance with example implementations, the hot plug controller 174 obtains multiple samples of the voltage comparison corresponding to the portion 366 and concludes that the far end termination has been detected.

Although FIG. 3B depicts the far end termination being dedicated using three injection currents, the far end termination may be detected using fewer than three or more than three injection currents. In general, the video display interface 131 increases the injection current magnitude at a rate that is slow enough to suppress reflections on the analog output signals 204 but is fast enough to complete the current magnitude increase to a targeted level within a pre-allotted time interval for detection. In accordance with example implementations, the video display interface 131 may gradually ramp up the injected currents in the far end detection process so that the current increases at a rate that helps to dampen the overall overshoot and ringback of the corresponding voltage, i.e., the injected current ramp up is controlled so that the current increases do not cause voltage glitches due to the inductive effects of relatively long cables. Moreover, in accordance with example implementations, the far end detection process may use a set of monotonically injection currents, and the far end detection process may continue from one injected current to the next until either a far end termination is detected or the last injection current of the set is reached without detection of a far end termination. In accordance with example implementations, the currents may be injected during a horizontal synchronization interval. However, in accordance with further example implementations, the currents may be injected into the vertical synchronization interval, which may be more advantageous because the relatively longer vertical synchronization (as compared to the horizontal synchronization) is significantly longer and therefore accommodates a slower ramp up of the injection current.

Figure 4:
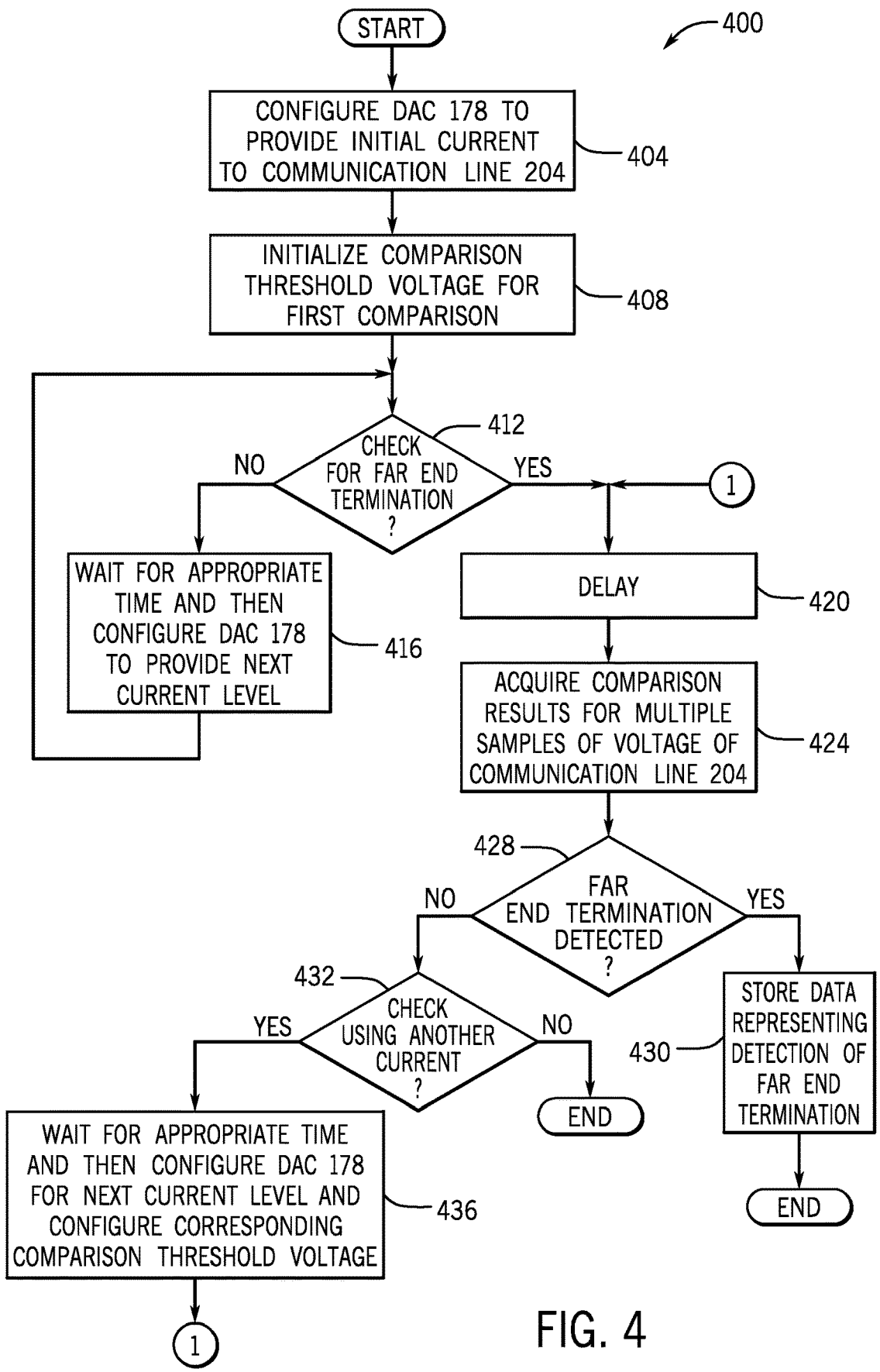
FIG. 4 is a flow diagram depicting a process used by a controller of the video display interface to detect a far end termination according to an example implementation.

Referring to FIG. 4 in conjunction with FIG. 2, in accordance with example implementations, the hot plug controller 174 may perform a process 400 for purposes of detecting a far end termination. It is noted that for this example, the hot plug controller 174 does not use one of the fixed current sources 250. However, in accordance with further example implementations, the hot plug controller 174 may use a fixed current source 250 to supplement the current source provided by the DAC 178. Moreover, although for this example, the process 400 involves the use of a single current output DAC 178 corresponding to a single video output communication line 204, the process 400 may involve multiple current output DACs 178 and multiple corresponding video output communication lines 204, in accordance with further implementations. For implementations in which voltage comparisons from multiple video output communication lines 204 are used, the far end termination detection process may, for example, deem that a far end termination has been detected in response to the voltage comparisons from a predetermined number (e.g., two or three) of the lines 204 indicating far end termination detection.

Pursuant to block 404 of the process 400, the hot plug controller 174 configures the current output DAC 178 to provide an initial current to the video output communication line 204 and initializes (block 408) a comparison threshold voltage for the first comparison (i.e., sets the voltage threshold for the corresponding comparator 182). In accordance with some implementations, one or multiple initial current magnitudes may be solely for purposes of ramping up the injected currents at a controlled rate and not used for purposes of comparing voltages for purposes of detecting a far end termination. As such, pursuant to decision block 412, the display controller 174 determines whether for the current injected current magnitude, whether voltage comparisons are to be made to detect for a far end termination. If not, the hot plug controller 174, pursuant to block 416, waits for the appropriate time and then configures the current output DAC 178 to provide the next current level and returns to decision block 412.

If voltage comparisons are to be made, then, pursuant to block 420, the hot plug controller 174 delays to bypass transient voltage effects and then acquires (block 424) comparison results for multiple samples of the voltage of the video output communication line 204, pursuant to block 424. If, as a result of these voltage comparisons, the hot plug controller 174 determines (decision block 428) that a far end termination has been detected, then the process 400 is complete, and the hot plug controller 174 stores (block 430) data representing detection of the far end termination. Otherwise, if, pursuant to decision block 428, the far end termination has not been detected, the hot plug controller 174 determines (decision block 432) whether to check for the far end termination using another current magnitude. If so, in accordance with example implementations, the hot plug controller 174 waits (block 436) for the appropriate time, configures the DAC 178 for the next current level and configures the corresponding comparison threshold before control returns to block 420. It is noted that although FIG. 4 depicts a time-based filtering (i.e., the use of the delay 420), the process 400 may use additional and/or other types of filtering, as described herein.

Referring back to FIGS. 1 and 2, in accordance with example implementations, the video display interface 131 may inject currents into one or multiple video output communication lines 204 for purposes of detecting the near end termination 191. In this manner, the video display interface 131, via its inclusion in the BMC 130, may be incorporated into a number of different server products, and some of these server products may use functions of the BMC but not use the video display interface 131. As such, for these products, the corresponding computer system may not include the connector 190 and corresponding near end termination 191. Accordingly, in accordance with example implementations, the hot plug controller 174 may inject currents into one or multiple video output communication lines 204 and based on resulting voltage comparisons, determine whether the video display interface 131 is being used.

For the near end termination detection, in accordance with example implementations, the hot plug controller 174 may, for a given injected current magnitude (provided by, for example, one of the current output DACs 178), set the corresponding voltage threshold of the corresponding voltage comparator 182 to compare the voltage of the video output communication line 204 to a voltage that corresponds to the product of the injected current magnitude and the expected resistance if the near end termination is present. For example, in accordance with example implementations, a 75 ohm resistance near end termination may be expected, and therefore, if the near end termination is present, the video output communication line 204 should be connected to 75 ohms or less (depending on whether the video cable is connected). Accordingly, for the near end termination detection, the hot plug controller 174 may set the voltage comparison threshold to, for each injected current, to correspond to the product of the 75 ohms and the magnitude of the current. Therefore, near end termination is detected when the voltage comparisons indicate that the voltage is less than the threshold.

In accordance with some implementations, for purposes of detecting the near end termination, the video display interface 131 may use a process similar to the processes described above for detecting far end termination, with the difference being the thresholds that are used.

Figure 5:
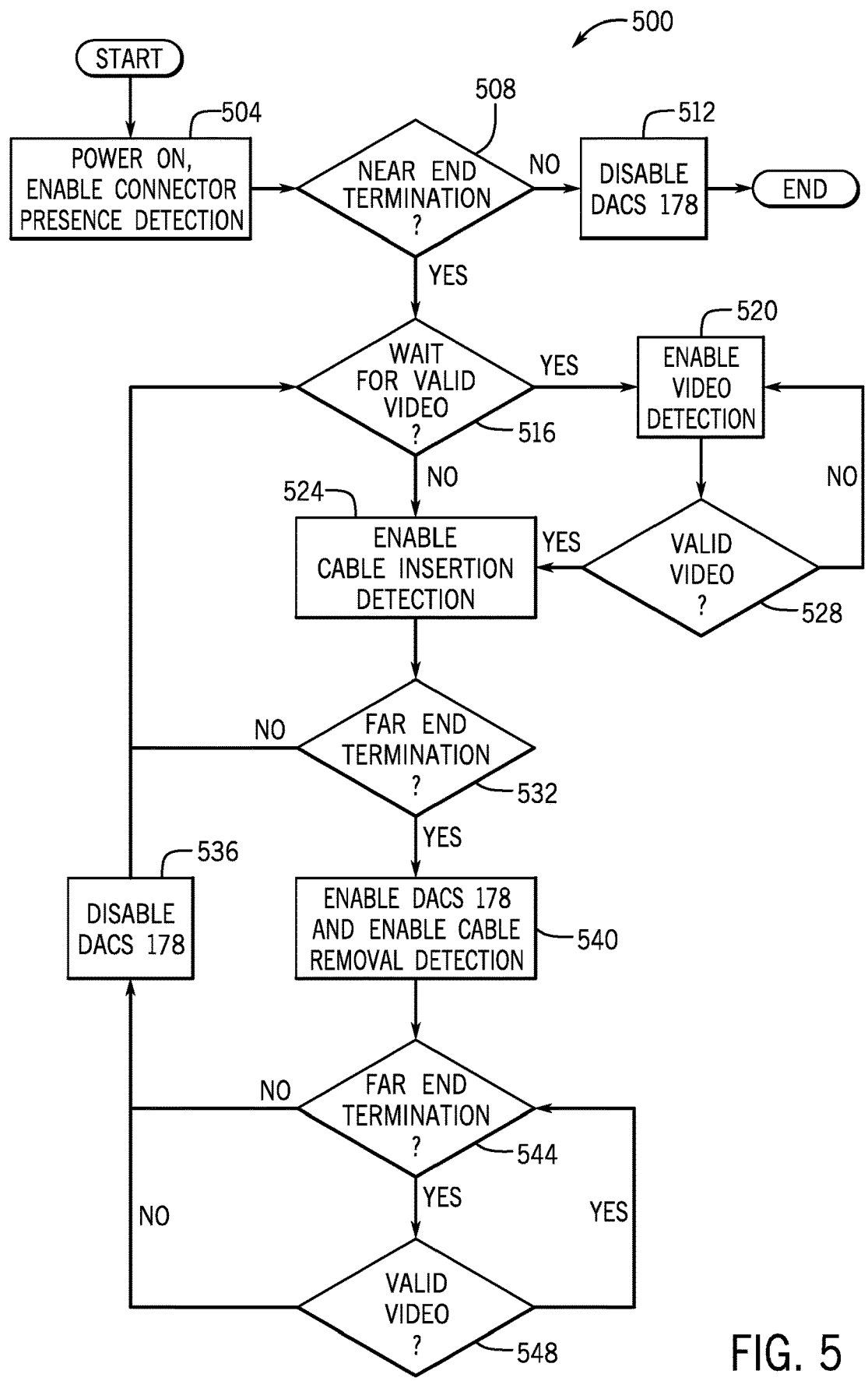
FIG. 5 is a flow diagram depicting a process used by the video display interface to detect a near end termination, a far end termination and cable disconnection according to an example implementation.

Referring to FIG. 5 in conjunction with FIG. 2, in accordance with example implementations, the hot plug controller 174 may perform a process 500 for purposes of detecting whether the video display interface 131 is being used (i.e., for purposes of detecting a near end termination); detecting whether a cable is connected to the connector 190 (i.e., for purposes of detecting far end termination); and detecting cable disconnection (i.e., detecting when the far end termination is no longer present). Pursuant to block 504, the hot plug controller 174 powers on and enables connector presence detection. In other words, pursuant to block 504, the hot plug controller 174 detects whether a near end termination is present (decision block 508) and if not, disables the current output DACs 178, pursuant to block 512. The disabling of the current output DACs 178 conserves power and reduces EMI emissions.

If the near end termination is detected (decision block 508), then, pursuant to decision block 516, the hot plug controller 174 determines whether an option has been selected to configure the controller 174 to wait for a valid video input to the video display interface 131. In accordance with an example implementation, the determination of whether a valid video input exists may be performed by measuring the number of times that the horizontal and vertical synchronization signals transition in a given time period. If the horizontal and vertical synchronization signals do not transition faster than the slowest expected video resolution (with some margin), then a determination is made that a valid video input does not exists; and otherwise, it is assumed that a valid video input exists.

Other techniques may be used to determine whether valid video input exists, in accordance with further implementations. For example, in accordance with further implementations, determining whether a valid video input exists may involve monitoring a state condition or other output of the SVGA controller 175 (FIG. 1). More specifically, in accordance with some implementations, the SVGA controller 175 may provide a DAC enable output 222, which may be intercepted by the hot plug controller 174 for purposes of determining whether the SVGA controller 175 intends to provide video content. The hot plug controller 174 may gate this DAC enable output 222 to control the enabling and disabling of the current output DACs 178 based on the sensed condition of the near end and far end terminations. As another example, in accordance with further implementations, determining whether a valid video input exists may involve determining whether data is being written to a video frame buffer or memory.

Upon determining that the option is selected to wait for a valid video, the hot plug controller 174 enables (block 520) video detection and determines (decision block 528) whether a valid video input is present. If valid video is detected, then control proceeds to block 524 in which cable insertion detection is enabled. In other words, here, in accordance with example implementations, the hot plug controller 174 performs the process of detecting whether or not a far end termination is present. If not, pursuant to decision block 532, control returns to decision block 516. However, if far end termination is detected, then, in accordance with example implementations, the hot plug controller 174 begins a process to monitor for cable disconnection.

More specifically, pursuant to block 540, in accordance with example implementations, the hot plug controller 174 may enable the current output DACs 178 and periodically check whether the far end termination is still present, i.e., check whether the cable has been removed, or disconnected. In accordance with some implementations, the hot plug controller 174 may check for the far end termination in a manner similar to that described above.

If far end termination is no longer detected (decision block 544), then, in accordance with example implementations, the hot plug controller 174 disables the current output DACs 178, pursuant to block 536; and control returns to decision block 516. If a decision is made (decision block 544) that far end termination is still present, then the video display controller determines (decision block 548) whether a valid video still exists. If not, control transitions to block 536. Otherwise, the far end termination detection process continues by control returning to decision block 544.

In accordance with example implementations, the hot plug controller 174 uses a hysteresis-based approach for the voltage comparisons, depending on whether cable insertion or cable removal is being detected. For example, in accordance with some implementations, the hot plug controller 174 sets up the voltage comparator(s) 182 to use a first set of thresholds for purposes of detecting cable insertion (i.e., for purposes of detecting for the presence of the far end termination when the current termination state represents that the far end termination is absent); and the hot plug controller 174 sets up the voltage comparator(s) 182 to use a second set of thresholds (different from the first set of thresholds) for purposes of detecting cable removal (i.e., for purposes of detecting for the absence of the far end termination when the current termination state represents that the far end termination is present). For example, for a given injection current $I_A$, the hot plug controller 174 may detect cable insertion by determining (through the use of a comparator 182) whether the voltage of the video output communication line 204 is below a $V_{TA}$ threshold (e.g., a threshold that corresponds to 37.5 ohms being coupled to the line 204). For purposes of detecting cable removal using the same injection current $I_A$, the hot plug controller 174 may detect the absence of the far end termination by determining whether the voltage of the video output communication line 204 is above a different $V_{TB}$ threshold (e.g., a threshold that corresponds to 75 ohms being coupled to the line), with the $V_{TB}$ threshold being larger than the $V_{TA}$ threshold. In accordance with further example implementations, the hot plug controller 174 sets up the current output DAC(s) 178 to provide a first set of currents for purposes of detecting cable insertion; and the hot plug controller 174 sets up the current output DAC(s) 178 to provide a second set of currents (different from the first set of currents) for purposes of detecting cable removal. In general, in accordance with example implementations, the video display interface 131 may use one set of injection current/voltage comparison threshold pairs for detecting cable insertion and a different set of injection current/voltage comparison threshold pairs for detecting cable removal. In other words, the hot plug controller 174, in accordance with example implementations, selects the particular set of injection current/voltage comparison threshold pairs that are used based on the current, recorded termination state.

In accordance with some implementations, the hot plug controller 174 performs the far end termination detection process during specific time slots or intervals of the video stream. For example, for VGA, the near end and far end termination processes may be conducted during synchronization intervals, such as the horizontal and vertical synchronization intervals where no video content is being sent, to avoid interference with the video content. In accordance with some implementations, the far end and near end termination detection processes may be performed in the vertical synchronization interval. The far end and near end detection processes may be performed in different intervals or may be performed in intervals other than the synchronization intervals, in accordance with further implementations.

Figure 6:
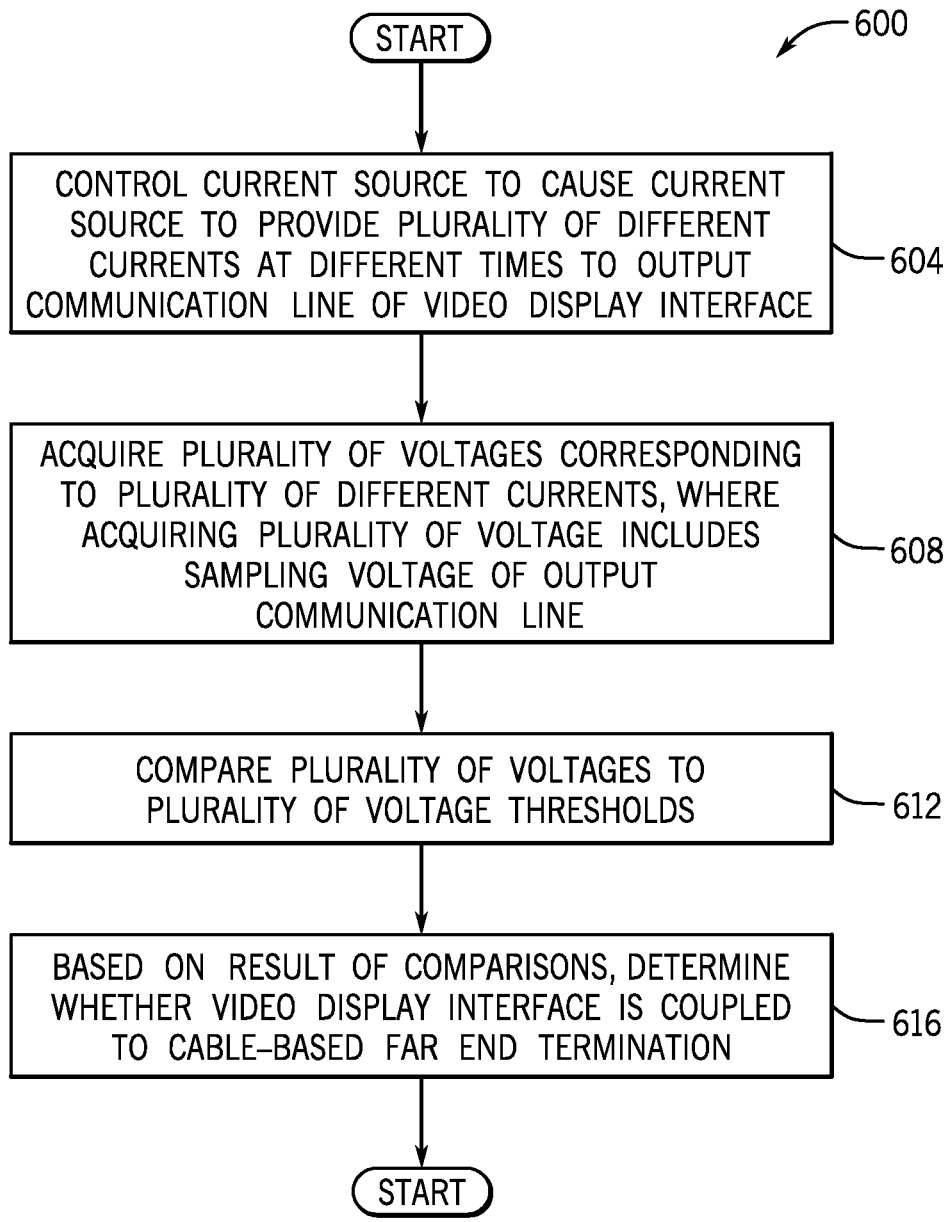
FIG. 6 is a flow diagram depicting a process to determine whether a video display interface is coupled to a cable-based far end termination according to an example implementation.

Referring to FIG. 6, in accordance with example implementations, a process 600 includes controlling (block 604) a current source to cause the current source to provide a plurality of different currents at different times to an output communication line of a video display interface; and acquiring (block 608) a plurality of voltages corresponding to the plurality of different currents. Acquiring the plurality of voltages includes sampling a voltage of the output communication line. The process 600 includes comparing (block 612) the plurality of voltages to a plurality of voltage thresholds; and, pursuant to block 616, based on a result of the comparison, determining whether the video display interface is coupled to a cable-based far end termination.

Figure 7:
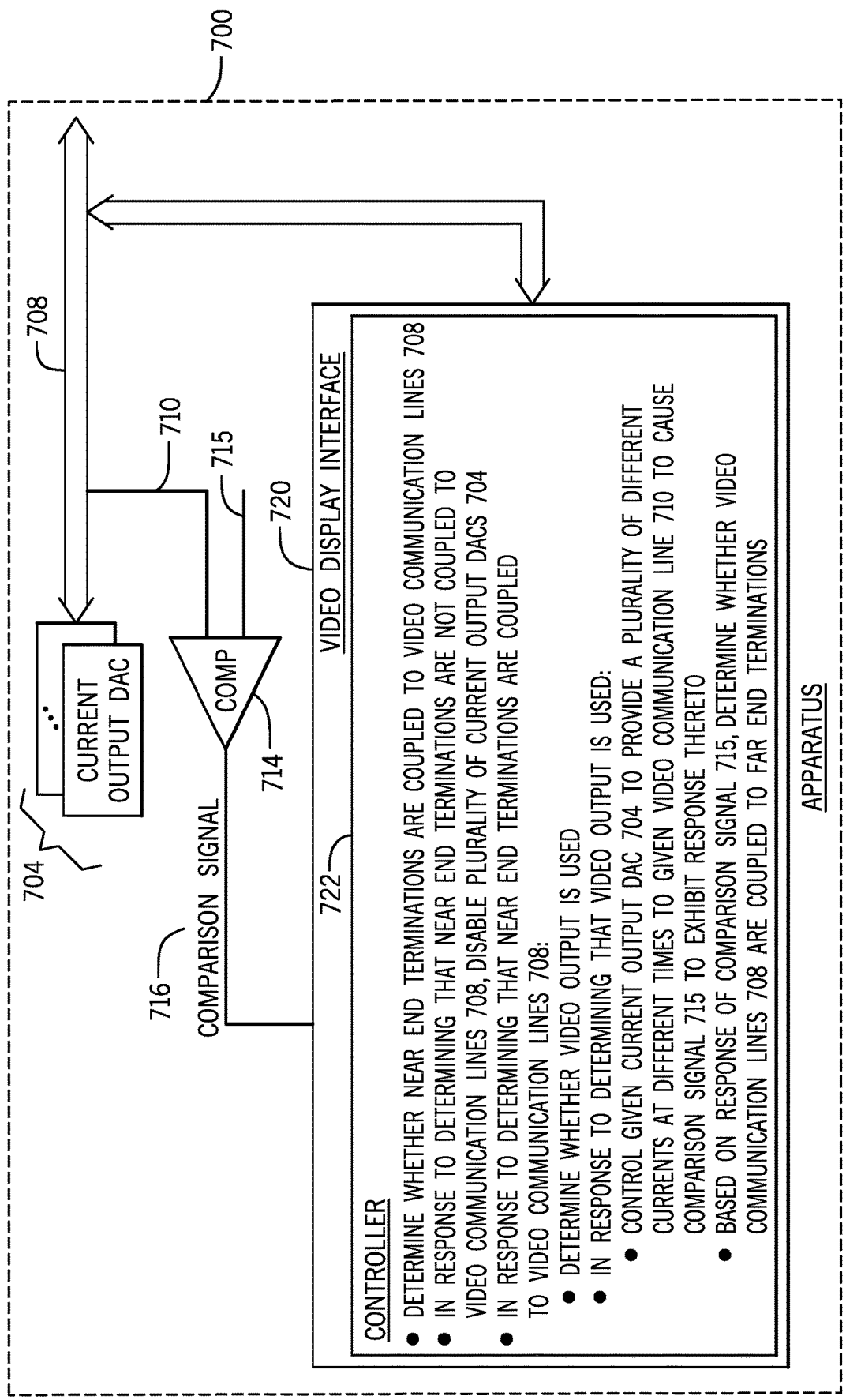
FIG. 7 is a schematic diagram depicting an apparatus having a video display interface to determine whether video communication lines are coupled to far end terminations according to an example implementation.

Referring to FIG. 7, in accordance with example implementations, an apparatus 700 includes a plurality of current output digital-to-analog controllers (DACs) 704; a comparator 714; and a video display interface 720. The plurality of current DACs 704 are coupled to the video communication lines 708. The comparator 714 has a first input 710 that is coupled to a given video communication line 708, a second input 715 and an output 716 to provide a comparison signal representing a comparison of the first input 710 to the second input 715. A controller 722 of the video display interface 720 determines whether near end terminations are coupled to the video communication lines 708; and in response to determining that the near end terminations are not coupled to the video communication lines 708, determines whether a video output is used. The controller 722, in response to determining that the video output is used, controls a given current output DAC 704 to provide a plurality of different currents at different times to the given video communication line 708 to cause the comparison signal to exhibit a response thereto; and based on a response of the comparison signal, determine whether the video communication lines 708 are coupled to far end terminations.

Figure 8:
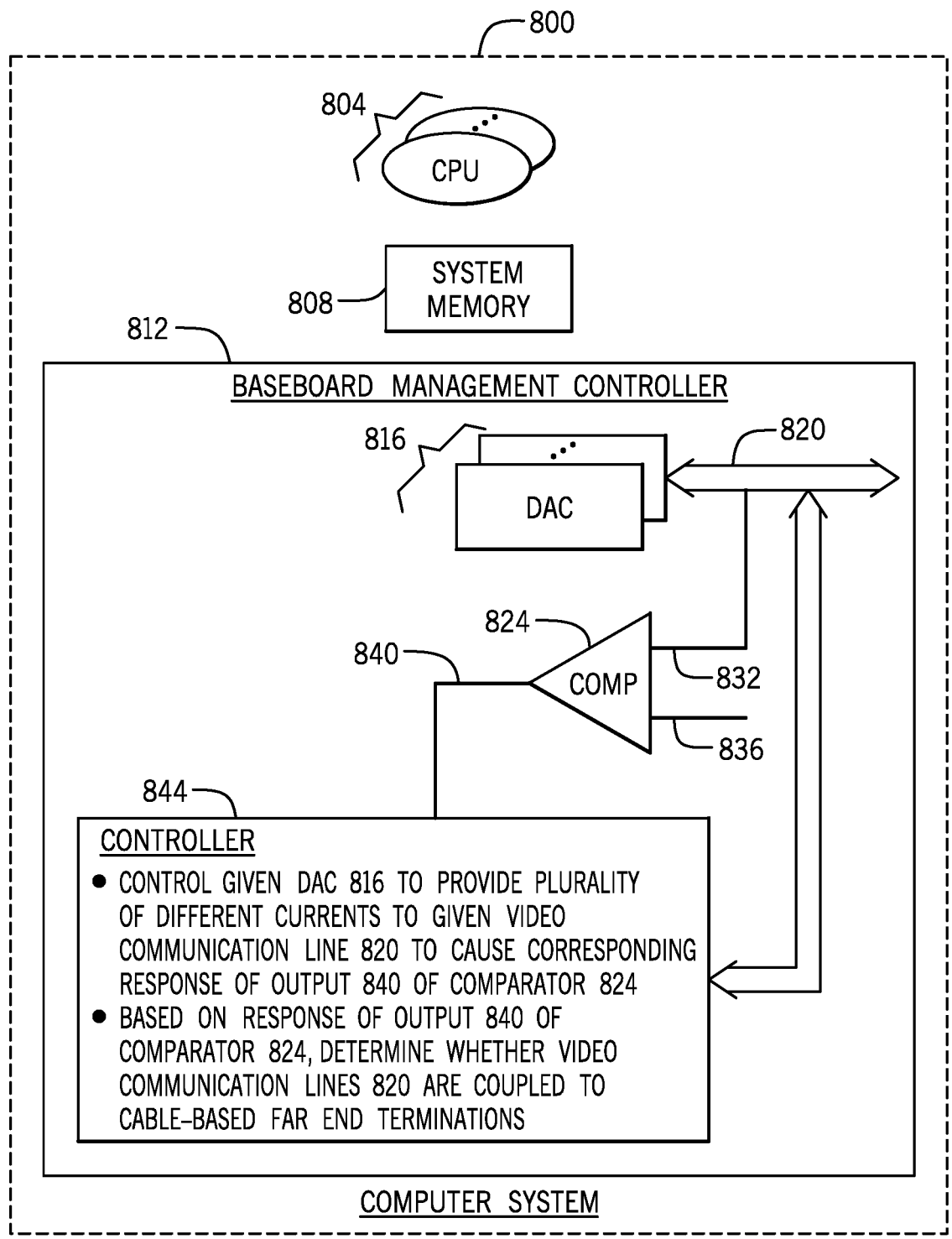
FIG. 8 is a schematic diagram of a computer system having a baseboard management controller that includes a controller to determine whether video communication lines are coupled to cable-based far end terminations according to an example implementation.

Referring to FIG. 8, in accordance with example implementations, a computer system 800 includes a plurality of central processing units (CPUs) 804; a system memory 808 and a baseboard management controller 812. The baseboard management controller 812 includes digital-to-analog controllers (DACs) 816; a comparator 824; and a controller 844. The DACs 816 are coupled to video communication lines 820. The comparator 824 includes a first input 832 that is coupled to a voltage of a given video communication line 820, a second input 836 that is coupled to a threshold, and an output 840. The controller 844 controls the given DAC 816 to provide a plurality of different currents to the given video communication line 820 to cause a corresponding response of the output 840 of the comparator 824. The controller 844, based on the response of the output 840 of the comparator 824, determines whether the video communication lines 820 are coupled to cable-based far end terminations.

In accordance with example implementations, controlling the current source includes controlling the current source to provide the plurality of different currents according to an ordered sequence such that a current of the output communication line monotonically increases in magnitude over a time period. A particular advantage is that detection of the far end termination is more reliable because of the ability to accommodate any variations or imperfections of the video communication lines.

In accordance with example implementations, controlling the current source includes controlling a rate of increase of a magnitude of the current over time to inhibit an overshoot of a voltage of the output communication line. A particular advantage is that detection of the far end termination is more reliable because of the ability to prevent false detection on the video communication lines.

In accordance with example implementations, sampling the voltage includes acquiring multiple time successive samples of the voltage for a given current, and the determining includes determining whether the video display interface is coupled to the cable-based far end termination based on a number of the multiple time successive samples corresponding to a voltage at or below a predetermined voltage. A particular advantage is that detection of the far end termination is more reliable because of the ability to prevent erroneous detection due to poor connection on the video communication lines.

In accordance with example implementations, controlling the current source includes causing the current source to provide a given current to the output communication line; and comparing the plurality of voltages includes selecting a given voltage threshold based on recorded cable termination state and a magnitude of the given current, and comparing the voltage corresponding to the given current to the given voltage threshold. A particular advantage is that far end termination is more reliable because of the ability to accommodate any variations or imperfections of the video communication lines.

In accordance with example implementations, acquiring the plurality of voltages further includes acquiring a filter to inhibit sampling of a time portion of the voltage of the output communication line corresponding to a glitch, a back-driven current or a ring-back effect. A particular advantage is that detection of the far end termination is more reliable because of the ability to prevent erroneous detection due to momentary signal fluctuations.

In accordance with example implementations, controlling the current source includes controlling a current output digital-to-analog converter (DAC) corresponding to a Video Graphics Array (VGA) signal line. A particular advantage is that detection of the far end termination is more reliable because of the ability to vary the control current source independently to achieve specific detection voltage thresholds.

In accordance with example implementations, controlling the current source includes regulating a time period in which the different currents are provided to the output communication line to coincide with a vertical synchronization interval. A particular advantage is that detection of the far end termination is more reliable because of the ability to avoid false detection due to interference with video output on the video communication lines.

In accordance with example implementations, prior to controlling the current source to provide the plurality of different currents, a near end termination is detected; and the controlling, acquiring, comparing and determining are performed in response to the near end termination being detected. A particular advantage is that a determination is made whether a video interface is being used.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   controlling, by a controller, a current source to cause the current source to provide a plurality of different currents at different times to an output communication line of a video display interface;
   acquiring, at a comparator circuit, a plurality of voltages corresponding to the plurality of different currents, wherein acquiring the plurality of voltages comprises sampling a voltage of the output communication line;
   comparing, by the comparator circuit, the plurality of voltages to a plurality of voltage thresholds; and
   based on a result of the comparison, determining, by the controller, whether the video display interface is coupled to a cable-based far end termination.

2. The method of claim 1, wherein controlling the current source comprises controlling the current source to provide the plurality of different currents to the output communication line according to an ordered sequence such that a current of the output communication line monotonically increases in magnitude over a time period.

3. The method of claim 2, wherein controlling the current source further comprises controlling the current source to control a rate of increase of the magnitude of the current of the output communication line over the time period to inhibit an overshoot of the voltage of the output communication line.

4. The method of claim 1, wherein sampling the voltage comprises acquiring multiple time
   successive samples of the voltage of the output communication line for a given current of the plurality of different currents, and the determining comprises determining whether the video display interface is coupled to the cable-based far end termination based on a number of the multiple time successive samples corresponding to a voltage at or below a predetermined voltage.

5. The method of claim 1, wherein:
   controlling the current source comprises causing the current source to provide a given current of the plurality of different currents to the output communication line; and
   comparing the plurality of voltages comprises:
      selecting a given voltage threshold of the plurality of voltage thresholds based on a recorded cable termination state and a magnitude of the given current; and
      comparing the voltage corresponding to the given current to the given voltage threshold.

6. The method of claim 1, wherein acquiring the plurality of voltages further comprises applying a filter to inhibit sampling of a time portion of the voltage of the output communication line corresponding to a glitch, a back-driven current or a ring-back effect.

7. The method of claim 1, wherein controlling the current source comprises controlling a current output digital-to-analog converter (DAC) corresponding to a Video Graphics Array (VGA) signal line.

8. The method of claim 7, further comprising controlling a current source other than the current output DAC to contribute to the plurality of different currents.

9. The method of claim 1, wherein controlling the current source comprises regulating a time period in which the different currents are provided to the output communication line to coincide with a vertical synchronization interval.

10. The method of claim 1, further comprising:
    prior to controlling the current source to provide the plurality of different currents, detecting a near end termination; and
    performing the controlling, acquiring, comparing and determining in response to the near end termination being detected.

11. The method of claim 1, further comprising:
    controlling at least one additional output communication line of the video display interface to provide a plurality of different currents at different times to the at least one additional output communication line; and sampling a plurality of voltages of the at least one additional output communication line corresponding to the plurality of different currents being provided to the at least one additional output communication line, wherein determining whether the video display interface is coupled to the cable-based far end termination further comprises determining whether the video display interface is coupled to the cable-based far end termination based on a comparison of the plurality of voltages sampled from the at least one additional output communication line to a plurality of voltage thresholds.

12. An apparatus comprising:
a plurality of current output digital-to-analog converters (DACs) coupled to video communication lines;
a comparator having a first input coupled to a given video communication line of the plurality of video communication lines, a second input, and an output to provide a comparison signal representing a comparison of the first input to the second input; and
a video display interface, wherein the video display interface comprises a controller to:
  determine whether near end terminations are coupled to the plurality of video communication lines;
  in response to determining that the near end terminations are not coupled to the plurality of video communication lines, disable the plurality of current output DACs; and
  in response to determining that the near end terminations are coupled to the plurality of video communication lines:
    determine whether a video output of the video display interface is used; and
    in response to determining that the video output of the video display controller is used:
      control a given current output DAC of the plurality of current output DACs to provide a plurality of different currents at different times to the given video communication line to cause the comparison signal to exhibit a response thereto; and
      based on the response of the comparison signal, determine whether the video communication lines are coupled to far end terminations.

13. The apparatus of claim 12, wherein the controller controls the given current output DAC to ramp up a current provided by the given output current DAC to the given video communication line, and control a rate at which the ramping occurs to suppress a reflection-based voltage overshoot in a voltage of the given video communication line.

14. The apparatus of claim 12, wherein the controller applies a filter to inhibit at least one of a glitch, a backdrive current or a ring-back effect in a voltage of the given video communication line from affecting the response of the comparison signal.

15. The apparatus of claim 12, wherein a plurality of far end termination devices provide the far end terminations, each far end termination device of the plurality of far end termination devices providing a far end termination of the far end terminations in response to a current of a video communication line of the plurality of video communication lines being above a threshold current, and the plurality of different currents comprise a current at or above the threshold current.

16. A computer system comprising:
a plurality of central processing units (CPUs);
a system memory; and
a baseboard management controller comprising a video display interface, wherein the video display interface comprises:
  a plurality of digital-to-analog converters (DACs) coupled to video communication lines, wherein the plurality of DACs comprise a given DAC, and the video communication lines comprise a given video communication line;
  a comparator comprising a first input coupled to a voltage of a given video communication line of the video communication lines, a second input coupled to a threshold and an output; and
  a controller to:
    control the given DAC to provide a plurality of different currents to the given video communication line to cause a corresponding response of the output of the comparator; and
    based on the response of the output of the comparator, determine whether the video communication lines are coupled to cable-based far end terminations.

17. The computer system of claim 16, wherein the controller determines that the video communication lines are coupled to far end terminations, and the video display controller is to control at least one DAC of the plurality of DACs to detect removal of the cable-based far end terminations.

18. The computer system of claim 16, wherein the controller is to control at least one DAC of the plurality of DACs to detect whether the video communication lines are coupled to near end terminations.

19. The computer system of claim 18, whether the controller is to:
in response to failing to detect that the video communication lines are coupled to near end terminations, disable the plurality of DACs.

20. The computer system of claim 16, wherein the controller:
causes the given DAC to provide a given current of the plurality of different currents to the given video communication line; and
selects a given voltage threshold for the comparator based on a recorded cable termination state and a magnitude of the given current, wherein the comparator compares the voltage of the given communication line to the given voltage threshold.

* * * * *